United States Patent
Uematsu et al.

(10) Patent No.: US 9,728,295 B2
(45) Date of Patent: Aug. 8, 2017

(54) CONDUCTIVE JACKET

(71) Applicant: BOREALIS AG, Vienna (AT)

(72) Inventors: Takashi Uematsu, Stenungsund (SE);
Christer Svanberg, Kallered (SE);
Niklas Thorn, Stenungsund (SE);
Karl-Michael Jager, Gothenburg (SE);
Asa Linder, Gothenburg (SE); Lars Westling, Hackettstown, NJ (US)

(73) Assignee: BOREALIS AG, Vienna (AT)

( * ) Notice: Subject to any disclaimer, the term of this patent is extended or adjusted under 35 U.S.C. 154(b) by 103 days.

(21) Appl. No.: 14/411,937

(22) PCT Filed: Aug. 30, 2013

(86) PCT No.: PCT/EP2013/002605
§ 371 (c)(1),
(2) Date: Dec. 30, 2014

(87) PCT Pub. No.: WO2014/032806
PCT Pub. Date: Mar. 6, 2014

(65) Prior Publication Data
US 2015/0170787 A1 Jun. 18, 2015

(30) Foreign Application Priority Data
Aug. 31, 2012 (EP) .................................. 12006195

(51) Int. Cl.
*H01B 1/24* (2006.01)
*C08L 23/06* (2006.01)
*C08L 23/08* (2006.01)
*C08K 5/00* (2006.01)

(52) U.S. Cl.
CPC .............. *H01B 1/24* (2013.01); *C08L 23/06* (2013.01); *C08L 23/0869* (2013.01); *C08K 5/005* (2013.01); *C08L 2203/202* (2013.01); *Y10T 428/294* (2015.01)

(58) Field of Classification Search
CPC ................ C08L 23/06; C08L 23/0869; C08L 2203/202; H01B 1/24; C08K 5/005; Y10T 428/294
USPC ............................ 252/511, 500; 174/102 SC
See application file for complete search history.

(56) References Cited

U.S. PATENT DOCUMENTS

| | | | |
|---|---|---|---|
| 5,338,589 A | 8/1994 | Bohm et al. | |
| 6,514,608 B1 | 2/2003 | Foulger | |
| 6,649,698 B1 | 11/2003 | Mehta | |
| 8,425,806 B2* | 4/2013 | Noyens | B82Y 10/00 174/102 SC |
| 8,907,218 B2* | 12/2014 | Steffl | C08L 23/04 174/110 AR |
| 9,404,005 B2* | 8/2016 | Sutton | C08L 23/06 |
| 2008/0093104 A1* | 4/2008 | Gahleitner | C08L 23/04 174/110 SR |
| 2008/0157028 A1* | 7/2008 | Nylander | H01B 1/24 252/511 |
| 2009/0020749 A1* | 1/2009 | Jager | C08F 210/02 257/40 |
| 2010/0206607 A1* | 8/2010 | Noyens | B82Y 10/00 174/102 SC |
| 2010/0231228 A1 | 9/2010 | Koelbin et al. | |
| 2011/0114365 A1* | 5/2011 | Torgersen | C08L 23/0869 174/120 SC |
| 2011/0162868 A1* | 7/2011 | Torgersen | C08L 23/0846 174/120 SC |
| 2012/0018190 A1* | 1/2012 | Smedberg | B29C 47/0021 174/120 SC |
| 2012/0305284 A1* | 12/2012 | Nilsson | C08F 10/02 174/110 SR |
| 2012/0325515 A1* | 12/2012 | Steffl | C08L 23/04 174/110 SR |

FOREIGN PATENT DOCUMENTS

| | | | | |
|---|---|---|---|---|
| AT | WO 2011023440 A1 * | 3/2011 | | C08L 23/04 |
| EP | 0 837 905 B1 | 9/1999 | | |
| EP | 1 415 999 A1 | 5/2004 | | |
| EP | 2 182 524 A1 | 5/2010 | | |
| WO | WO 92/12182 | 7/1992 | | |
| WO | WO 96/18662 | 6/1996 | | |
| WO | WO 97/03124 | 1/1997 | | |
| WO | WO 00/26258 | 5/2000 | | |
| WO | WO 2011/149463 A1 | 12/2011 | | |
| WO | WO 2012/048927 A2 | 4/2012 | | |

OTHER PUBLICATIONS

International Search Report mailed Jan. 15, 2014 for International application No. PCT/EP2013/002605.
International Preliminary Report on Patentability issued Mar. 3, 2015 for International application No. PCT/EP2013/002605.

* cited by examiner

*Primary Examiner* — Douglas McGinty
(74) *Attorney, Agent, or Firm* — Richard M. Klein; Fay Sharpe LLP

(57) ABSTRACT

The present invention relates to a new semiconductive composition, which comprises 50 to 98 weight percentage (wt %) of a polymer blend, 2 to 50 wt % of a conductive filler and 0.05 to 2 wt % of an antioxidant; wherein said polymer blend comprises 10 to 99 wt % of a multimodal high density polyolefin, which high density polyolefin has a density which is from 930 to 970 kg/m$^3$ and a melt flow rate (MFR2@190° C.) according to ISO 1133 (190° C., 2.16 kg) which is less than 1.6 g/10 min, and 1 to 90 wt % of a thermoplastic elastomer, a process for producing a semiconductive composition, and a semiconductive jacket comprising the semiconductive composition, and a power cable comprising the semiconductive jacket or comprising the semiconductive composition, or use of a semiconductive jacket or a semiconductive composition in, for example, a power cable.

21 Claims, No Drawings

CONDUCTIVE JACKET

FIELD OF THE INVENTION

The present invention relates to a new semiconductive composition, a process for producing a semiconductive composition, a semiconductive jacket comprising the semiconductive composition, and a power cable comprising the semiconductive jacket or comprising the semiconductive composition.

BACKGROUND OF THE INVENTION

Semiconductive jackets are useful, for example, in medium and high voltage underground and submarine power cable applications.

The National Electrical Safety code requires that underground power cables with electrical insulation jackets must be grounded, at least, at approximately every 400 m. The grounding secures the system safety and also reduces the energy losses in a cable system during operation.

In order to avoid the need of periodic grounding and increase the system safety, the outer protective jacket of a cable may be coated with a layer of graphite in a powder form in order to make the surface of the outer jacket semiconductive, see e.g. US2010231228. Thus, by making the surface of the outer jacket semiconductive, the cable is grounded throughout the total length. When the cable is grounded throughout the total length, the cable system is advantageously diagnosable and any cable defects may become detectable by applying a high voltage of constant polarity (DC) on the semiconductive layer, or by performing a partial discharge test during production and/or after installation and/or even during operation. Furthermore, this may provide protection of the cable from lightening. However, it is in practice difficult to form a uniform graphite layer on the surface of the jacket and the formed graphite layer is also often mechanically vulnerable since the adhesion of graphite to the jacket tends to be weak. Alternatively, conductive varnish, which adheres stronger than graphite but has poor mechanical properties, may be applied on the surface of the jacket.

To improve the reliability of the semiconductive layer, semiconductive compositions, which may be extruded directly as an outer jacket layer, have been proposed.

The extrudable semiconductive compositions may be thermoplastic and normally comprise polyolefin, such as low density polyethylene (LDPE), linear low density polyethylene (LLDPE), medium density polyethylene (MDPE), high density polyethylene (HDPE) or a mixture comprising ethylene alkyl acrylate copolymer or ethylene vinyl acetate copolymer as a base resin, a conductive filler and additives, see e.g. WO2011149463, US2010231228 or U.S. Pat. No. 6,514,608.

However, to meet the physical requirements of a conductive jacket, it is required that the semiconductive compositions exhibit further improved mechanical properties such as a high shore D value, mechanical flexibility and high environmental stress cracking resistance (ESCR).

Traditionally, the conductive filler, such as carbon black, which is comprised in the semiconductive compositions, has been kept at a low content level to minimize its interference to the inherent mechanical performance of the base resin. For example, special high conductive carbon blacks, such as Ketjenblack, or other highly conductive fillers, have preferably been used in traditional semiconductive compositions in order to meet the electric requirements with regard to a low volume resistivity (VR) or a high conductivity, of a semiconductive jacket with a low content of a conductive filler.

Alternatively, a phase separation base resin system has also been used to maintain the conductive fillers in a continuous minor phase and to form a semiconductive composition. In the semiconductive composition formed with a phase separation base resin system, the VR value may be kept at a low level also with a low content of the conductive fillers (see U.S. Pat. No. 6,514,608).

However, the traditional approaches still have significant drawback such as the high cost of the special conductive fillers, or high extrusion process dependence of conductivity due to the nature of phase separation dynamics.

DESCRIPTION OF THE INVENTION

The present invention relates to a semiconductive composition, which semiconductive composition comprises 50 to 98 weight percentage (wt %) of a polymer blend, 2 to 50 wt % of a conductive filler and 0.05 to 2 wt % of an antioxidant; wherein said polymer blend comprises 10 to 99 wt % of a multimodal high density polyolefin, which high density polyolefin has a density which is from 930 to 970 kg/m$^3$ and a melt flow rate (MFR2@190° C.) according to ISO 1133 (190° C., 2.16 kg) which is less than 1.6 g/10 min, and 1 to 90 wt % of a thermoplastic elastomer.

Further, the semiconductive composition may suitably be comprised in a semiconductive jacket or sheath. Moreover, the semiconductive compositions in accordance with the present invention may suitably be extrudable directly as an outer jacket layer. Such extrusion of a semiconductive composition directly as an outer jacket layer may further improve the reliability of the resulting semiconductive layer.

The semiconductive jacket or sheath may be useful in power cable applications, for example, in medium and high voltage underground and submarine power cable applications.

It has surprisingly been found that by using the specific polymer blend in the semiconductive composition in accordance with the present invention it is possible to simultaneously fulfill desired requirements of mechanical flexibility, environmental stress cracking performance (ESCR), shore D and electrical properties also in a semiconductive compositions comprising comparably higher content levels of conductive fillers. Further, the multimodal high density polyolefin, which is comprised in the specific polymer blend in the semiconductive composition in accordance with the present invention, has a low MFR2@190° C. The sufficiently low MFR2@190° C. enhances the environmental stress cracking resistance, as well as, the Shore D of the semiconductive composition of the present invention.

ESCR is the resistance of a polymeric composition, here the semiconductive composition, to crack formation under action of mechanical stress and a reagent in the form of a surfactant. The ESCR is determined in accordance with ASTM D-1693 (condition B), and Igepal CO 630 is used as the reagent.

The multimodal high density polyolefin may be obtained, similarly, as described in EP0837905, or by any suitable polymerisation process known in the art. Further, the multimodal high density polyolefin may be obtained by polymerisation of α-olefin in two stages, or in more than two stages, and where the resulting polyolefin has a density of 930 to 970 kg/m$^3$ and a melt flow rate (MFR2@190° C.) which is less than 1.6 g/10 min.

Further, the multimodal high density polyolefin, e.g. a bimodal polyolefin, may be obtained by polymerisation of α-olefin in two stages. The resulting poly(α-olefin) mixture may then be a mixture of two poly(α-olefin)s, in which the first poly(α-olefin), i.e. the first α-olefin polymer, has a density of 930-975 kg/m$^3$ and a melt flow rate (MFR2@190° C.) of 50-2000 g/10 min, and the second poly(α-olefin), i.e. the second α-olefin polymer, has a density and a melt flow rate which is chosen so that the resulting polyolefin mixture, i.e. the olefin polymer mixture, has a density of 930 to 970 kg/m$^3$ and a melt flow rate (MFR2@190° C.) which is less than 1.6 g/10 min. Further, when the poly(α-olefin) mixture, i.e. the multimodal high density polyolefin, is a mixture of two poly(α-olefin)s, each poly(α-olefin), of said poly(α-olefin) mixture, is independently present in an amount of more than 10%, 20% or 30% by weight of the poly(α-olefin) mixture.

Further, the first poly(α-olefin), i.e. the first α-olefin polymer, may be produced in a first polymerisation zone, and the second poly(α-olefin), i.e. the second α-olefin polymer, may be produced in a second polymerisation zone. The first polymerization zone and the second polymerization zone may be connected in any order, i.e. the first polymerization zone may precede the second polymerization zone, or the second polymerization zone may precede the first polymerization zone or, alternatively, polymerization zones may be connected in parallel.

The polymerization zones may operate in slurry, solution, or gas phase conditions or any of their combinations. Examples of processes comprising cascaded slurry and gas phase polymerization stages are disclosed, among others, in WO9212182 and WO9618662. Thus, the main polymerisation stages may be carried out as a combination of slurry polymerisation/gas-phase polymerisation or gas-phase polymerisation/gas-phase polymerisation. The slurry polymerisation is preferably performed in a so-called loop reactor. The use of slurry polymerisation in a stirred-tank reactor is not preferred for the production of the multimodal high density polyolefin, since this method is not sufficiently flexible for the production of the multimodal polyolefin and it would involve solubility problems. In order to produce the multimodal high density polyolefin having improved properties, a flexible method is required. For this reason, it is preferred that the multimodal polyolefin is produced in two main polymerisation stages in a combination of loop reactor/gas-phase reactor or gas-phase reactor/gas-phase reactor. It is especially preferred that the multimodal high density polyolefin is produced in two main polymerisation stages, wherein the first stage is performed as slurry polymerisation in a loop reactor and the second stage is performed as gas-phase polymerisation in a gas-phase reactor. Optionally, the main polymerisation stages may be preceded by a pre-polymerisation step, in which pre-polymerisation step up to 20% by weight, or preferably 1-10% by weight, of the total amount of multimodal polyolefin, is produced. Generally, the technique results in a multimodal polyolefin mixture through polymerisation with the aid of chromium, metallocene or Ziegler-Natta catalyst in several successive polymerisation reactors. In the production of, for example, a bimodal polyethylene, which is the most preferred polymer for the multimodal polyolefin, a first polyethylene is produced in a first reactor under specific conditions with regard to monomer composition, hydrogen-gas pressure, temperature, pressure, and so forth. After the polymerisation in the first reactor, the reaction mixture, including the polymer produced, is fed to a second reactor, where further polymerisation takes place under other specific conditions.

Usually, a first polymer, having a high melt flow rate (low molecular weight) and a moderate or small addition of comonomers, or no addition of comonomers, is produced in the first reactor, whereas a second polymer, having a low melt flow rate (high molecular weight) and a greater addition of comonomers, is produced in the second reactor.

Furthermore, it may often be preferred to remove reactants of the preceding polymerization stage from the polymer before introducing it into the subsequent polymerization stage. This may preferably be done when transferring the polymer from one polymerization stage and/or zone to another. Suitable methods are disclosed, among others, in EP1415999 and WO0026258.

By the "modality" of a polymer, e.g. of the multimodal high density polyolefin as described herein, is meant the structure of the molecular-weight distribution of the polymer, i.e. the appearance of the curve indicating the number of molecules as a function of the molecular weight. If the curve exhibits one narrow maximum the polymer is referred to as "unimodal". If the curve exhibits a very broad maximum or two or more maxima and the polymer consists of two or more fractions, the polymer is referred to as "bimodal", "multimodal" etc. In the following, all polymers whose molecular-weight-distribution curve are very broad or have more than one maximum are jointly referred to as "multimodal".

"Multimodal" means here that the ratio of $M_w/M_n$ obtained by the "weight average molecular weight" ($M_w$) divided by the "number average molecular weight ($M_n$) is more than 5. A higher $M_w/M_n$ value indicates a broader molecular-weight-distribution curve. The $M_w$ and $M_n$ are determined by Gel Permeation Chromatography.

The $M_w$ may be from 1000 to 10 kg/mol to give a desired MFR of the multimodal high density polyolefin. A higher molecular weight may give a lower MFR and a lower molecular weight may give a higher MFR.

The multimodal high density polyolefin may be a polyolefin mixture, such as a mixture of propylene polymers and/or copolymers or a mixture of ethylene polymers and/or copolymers. Comonomer or comonomers, of the multimodal high density polyolefin in the present invention as described herein, may be chosen from the group consisting of α-olefins having up to 12 carbon atoms. In ethylene polymers and/or copolymers the comonomer or comonomers may be chosen from α-olefins having 3-12 carbon atoms. Examples of comonomers may be butene, 4-methyl-1-pentene, 1-hexene and 1-octene.

In view of the above, an exemplified polyolefin mixture may be a mixture of an ethylene polymer and an ethylene copolymer comprising a low-molecular ethylene homopolymer mixed with a high-molecular copolymer of ethylene and butene, 4-methyl-1-pentene, 1-hexene or 1-octene.

The properties of the individual polymers in the polyolefin mixture should be so chosen that the final polyolefin mixture has a density of 930-970 kg/m$^3$, 930-965 kg/m$^3$ or alternatively, 935-955 kg/m$^3$, and a melt flow rate (MFR2@190° C.) which is less than 1.6 g/10 min, from 0.1 to 1.6 g/10 min, or, alternatively, from 0.1 to 1.2 g/10 min. According to the invention, this is, for example, achieved by the polyolefin mixture, as described herein in accordance with the invention, and comprising a first olefin polymer, i.e. a first polyolefin, having a density of 0.930-0.975 g/cm$^3$, for example, 0.955-0.975 g/cm$^3$, and a melt flow rate (MFR2@190° C.) of 50-2000 g/10 min, for example, 100-1000 g/10 min, or, e.g., 200-800 g/10 min, and at least a second olefin polymer, i.e. a second polyolefin, having such a density and such a melt flow rate that the polyolefin mixture obtains the density and the melt flow rate as indicated above.

If the multimodal polyolefin mixture is bimodal, i.e. is a mixture of two polyolefins (a first olefin polymer and a second olefin polymer), and the first olefin polymer, which is produced in the first reactor stage, and has the density and the melt flow rate as indicated above, the density and the melt flow rate of the second olefin polymer, which second olefin polymer is produced in the second reactor stage, may, as indicated in the foregoing, be indirectly determined on the basis of the values of the materials supplied to and discharged from the second reactor stage.

Moreover, the thermoplastic elastomer, which is comprised in the specific polymer blend in the semiconductive composition in accordance with the present invention, improves the mechanical flexibility, or the notched bending cracking resistance, of the semiconductive composition of the present invention also when the semiconductive composition comprises a high content of conductive filler.

The thermoplastic elastomer, as used here in accordance with the present invention, is a polymer which has the ability to be stretched under stress and to return to, close to, its original shape when the stress is removed. Further, said thermoplastic elastomer does also melt at an elevated temperature. Moreover, the thermoplastic elastomer is mechanically softer than the multimodal high density polyolefin, and this property gives the mechanical flexibility or toughness to the polymer blend and to the semiconductive composition of the present invention.

Suitable thermoplastic elastomers include, but are not limited to, styrene block copolymers, thermoplastic polyurethanes, thermoplastic copolyesters, polyester block ethers, polybutylene terephthalate/polytetramethylene glycol ether copolymers, thermoplastic polyamide, polyolefin elastomers, such as TAFMER, of ethylene α-olefin copolymer and propylene α-olefin copolymer, and also unsaturated polyolefins, and any combination thereof.

Specifically, the unsaturated polyolefin may be made by any polymerisation process known in the art, preferably by a high pressure polymerisation process. The polymerisation process comprises polymerisation of monomer units with polar groups. The unsaturated polyolefin may further comprise a polymer with monomers units comprising polar groups. For example, monomer units are selected from $C_1$-$C_6$-alkyl acrylates, $C_1$-$C_6$-alkyl methacrylates, acrylic acids, methacylic acids and vinyl acetates. Furthermore, the unsaturated polyolefin comprises, for example, a copolymer of ethylene with $C_1$-$C_6$-alkyl, such as methyl, ethyl, propyl or butyl acrylates or vinyl acetate.

The monomers units, comprising polar groups, may also contain ionomeric structures (as in e.g. Dupont's Surlyn types).

It is preferred that the amount of polar groups units that originate from monomers, may be from 1 to 20 mol %, more preferably from 3 to 15 mol % and most preferably from 4 to 12 mol % with regard to the total amount of monomers in unsaturated polyolefin.

The polar monomer units may be incorporated by copolymerization of, e.g., olefin monomers with polar comonomers. This may also be achieved by grafting of polar monomers units, e.g., onto a polyolefin backbone.

In further embodiments the semiconductive composition of the present invention comprises 55 to 95, 55 to 94, 55 to 93, 55 to 92, 55 to 91, 55 to 90, 60 to 98, 60 to 95, 60 to 94, 60 to 93, 60 to 92, 60 to 91, 60 to 90, 60 to 89, 60 to 88, 60 to 87, 60 to 86, 60 to 85, 60 to 84, 60 to 83, 60 to 82, 65 to 95, 65 to 94, 65 to 93, 65 to 92, 65 to 91, 65 to 90, 70 to 95, 70 to 94, 70 to 93, 70 to 92, 70 to 91, 70 to 90, 72 to 90, 72 to 85 or, alternatively, 74 to 82 wt % of the polymer blend.

In still further embodiments the semiconductive composition of the present invention comprises 5 to 45, 6 to 45, 7 to 45, 8 to 45, 9 to 45, 10 to 45, 2 to 40, 5 to 40, 6 to 40, 7 to 40, 8 to 40, 9 to 40, 10 to 40, 11 to 40, 12 to 40, 13 to 40, 14 to 40, 15 to 40, 16 to 40, 17 to 40, 18 to 40, 5 to 35, 6 to 35, 7 to 35, 8 to 35, 9 to 35, 10 to 35, 5 to 30, 6 to 30, 7 to 30, 8 to 30, 9 to 30, 10 to 30, 10 to 28, 15 to 28 or, alternatively, 18 to 26 wt % of the conductive filler.

In even further embodiments the semiconductive composition of the present invention comprises the polymer blend which comprises 15 to 99, 15 to 95, 20 to 95, 25 to 95, 30 to 95, 35 to 90, 40 to 85, 45 to 80, 50 to 75, or, alternatively 55 to 75 wt % of the multimodal high density polyolefin, and 1 to 85, 5 to 85, 5 to 80, 5 to 75, 5 to 70, 10 to 65, 15 to 60, 20 to 55, 25 to 50, or, alternatively 25 to 45 wt % of the thermoplastic elastomer, respectively.

Still further embodiments of the present invention disclose a semiconductive composition which comprises 0.1 to 1.5, 0.2 to 1.5, 0.3 to 1.3, 0.4 to 1.2, 0.4 to 1.1, or, alternatively 0.4 to 1.0 wt % of the antioxidant.

Examples of antioxidants, in accordance with the invention, may be sterically hindered or semi-hindered phenols, aromatic amines, aliphatic sterically hindered amines, organic phosphates, thio compounds, quinolines and mixtures thereof.

Further, an antioxidant may be selected, in accordance with the invention, from an antioxidant containing at least one structural unit with at least 2 conjugated double bonds (see antioxidant in WO2012048927) which may increase conductivity, or decrease volume resistivity, of the semiconductive composition. Furthermore, an antioxidant, in accordance with the invention, may also be selected from the group of diphenyl amines and diphenyl sulfides. The phenyl substituents of these diphenyl amines and diphenyl sulfides may be substituted with further groups such as alkyl, alkylaryl, arylalkyl or hydroxy groups.

The phenyl groups of the diphenyl amines and diphenyl sulfides may be substituted with tert.-butyl groups, or in meta or para position, which may bear further substituents, for example, phenyl groups.

The antioxidant may be selected from, e.g., the group of 4,4'-bis(1,1'-dimethylbenzyl)diphenylamine, para-oriented styrenated diphenylamines, N-isopropyl-N'-phenyl-p-phenylene diamine, p-(p-toluene-sulfonylamido)-diphenylamine, N,N'-diphenyl-p-phenylene-diamine, N,N'-dinaphtyl-p-phenylene-diamine, p,p'-Dioctyldiphenylamine, 6,6'-di-tert.-butyl-2,2'-thiodi-p-cresol, tris(2-tert.-butyl-4-thio-(2'-methyl-4'hydroxy-5'-tert.-butyl)phenyl-5-methyl) phenylphosphite, polymerized 2,2,4-trimethyl-1,2-dihydroquinoline, or derivatives thereof.

Further, the above antioxidants may each be used separately as well as in any mixture thereof.

A further embodiment of the present invention comprises a semiconductive composition, as described herein, wherein the semiconductive composition comprises 60 to 91 wt % of the polymer blend, 9 to 40 wt % of the conductive filler and 0.1 to 1.0 wt % of the antioxidant; wherein said polymer blend comprises 30 to 90 wt % of the multimodal high density polyolefin and 10 to 70 wt % of the thermoplastic elastomer.

Still a further embodiment of the present invention comprises a semiconductive composition, as described herein, wherein the multimodal high density polyolefin is a bimodal high density polyolefin.

An even further embodiment of the present invention comprises a semiconductive composition, as described herein, wherein the multimodal high density polyolefin has a melt flow rate (MFR2@190° C.) according to ISO 1133 (190° C., 2.16 kg) which is 1.2 g/10 min or less.

A further embodiment of the present invention comprises a semiconductive composition, as described herein, wherein the multimodal high density polyolefin of which $M_w$ is from 500 to 60 kg/mol, and $M_w/M_n$ is more than 10 or more than 15.

In an even further embodiment of the present invention a semiconductive composition, as described herein, is disclosed, where the multimodal high density polyolefin comprises a multimodal molecular weight distribution α-olefin polymer mixture. In "a multimodal molecular weight distribution α-olefin polymer mixture" the number of the molecules as a function of the molecular weight shows a curve with a very broad maximum or with two or more maxima of the number of the molecules.

A further embodiment of the present invention comprises a semiconductive composition, as described herein, where the multimodal high density polyolefin comprises ethylene copolymer of at least one chosen from butane, 4-methyl-1-pentene, 1-hexene and 1-octene.

Still a further embodiment of the present invention comprises a semiconductive composition, as described herein, where the multimodal high density polyolefin comprises a mixture of a low-molecular ethylene homopolymer and a high-molecular ethylene copolymer of at least one chosen from butane, 4-methyl-1-pentene, 1-hexene and 1-octene.

In a further embodiment the semiconductive composition of the present invention comprises a multimodal high density polyolefin which has a melt flow rate (MFR2@190° C.) according to ISO 1133 (190° C., 2.16 kg) which is 1.2 g/10 min or less.

Further embodiments of the present invention disclose a semiconductive composition which comprises a multimodal high density polyolefin which has a melt flow rate (MFR2@190° C.) according to ISO 1133 (190° C., 2.16 kg) which is at the most: 1.3, 1.2, 1.1, 1.0, 0.9, 0.8, 0.7, or, alternatively, 0.6 g/10 min.

Still further embodiments of the present invention disclose a semiconductive composition which comprises a multimodal high density polyolefin which has lower limit of a melt flow rate (MFR2@190° C.) according to ISO 1133 (190° C., 2.16 kg) which is: 0.01, 0.03, 0.05, 0.1, 0.2, 0.3, 0.4 or, alternatively, 0.5 g/10 min, wherein said lower limit of a melt flow rate (MFR2@190° C.) according to ISO 1133 (190° C., 2.16 kg) may be combined with any upper limit of the melt flow rate (MFR2@190° C.) according to ISO 1133 (190° C., 2.16 kg), as described herein.

In still a further embodiment the semiconductive composition of the present invention comprises a multimodal high density polyolefin having a density which is from 931 to 969, 932 to 968, 933 to 967, 934 to 966, 935 to 965, 936 to 964, 936 to 963, 936 to 962, 936 to 961, 936 to 960, 936 to 959, 936 to 958, 936 to 957, 936 to 956, 936 to 955, or, alternatively, 936 to 954 kg/m³.

In still a further embodiment the semiconductive composition of the present invention comprises a multimodal high density polyolefin which has $M_w/M_n$ which is more than 5, more than 8, more than 10, or, alternatively, more than 15.

In still a further embodiment the semiconductive composition of the present invention comprises a multimodal high density polyolefin of which $M_w$ is from 1000 to 10, 900 to 20, 800 to 30, 700 to 40, 600 to 50, 500 to 60, 400 to 70, 300 to 70, or 250 to 80, alternatively 200 to 100 kg/mol.

In a further embodiment the semiconductive composition of the present invention comprises a conductive filler which is chosen from carbon black, graphite, expanded graphite, carbon nanotube, doped inorganic filler, powders of intrinsically-conductive polymers such as poly(p-phenylenevinylene), polyfluorene, polyaniline and polythiophene, graphene nanoplatelets or a mixture thereof.

In still a further embodiment the semiconductive composition of the present invention comprises a conductive filler, which conductive filler has a BET nitrogen surface area which is less than 700 m²/g, or which conductive filler has an Iodine number which is less than 700 mg/g.

The lower parameter number of the BET nitrogen surface area (according to ASTM D6556), i.e. less than 700 m²/g, and the lower parameter number of the Iodine number (according to ASTM D1510), i.e. less than 700 mg/g, of the conductive filler, indicate that the conductive filler has a comparably lower conductivity. Thus, in accordance with this embodiment of the present invention the conductive filler may be, for example, Ketjenblack, or a special grade of modified furnace black grade, but other conductive fillers may also be suitable, such as, for example, a non special conductive carbon black or a conventional carbon black, e.g. furnace black, acetylene carbon black or a standard grade of modified furnace black with a low value of the BET nitrogen surface area. Normally, the higher, the parameter number of the BET nitrogen surface area or the parameter number of the Iodine number, is of the conductive filler, the higher is the conductivity of the conductive filler.

Further embodiments of the present invention disclose a semiconductive composition which comprises a conductive filler, which conductive filler has a BET nitrogen surface area which is at the most: 650, 600, 550, 500, 450, 400, 350, 300, 250, 200, 150, 100, 80, or, alternatively, 75 m²/g, or which conductive filler has a Iodine number which is at the most: 650, 600, 550, 500, 450, 400, 350, 300, 250, 200, 150, 100, 80, or, alternatively, 75 mg/g.

Still further embodiments of the present invention disclose a semiconductive composition which comprises a conductive filler which conductive filler has a BET nitrogen surface area which is at least: 20, 30, 40, 45, 50, 55 alternatively 60 m²/g, or which conductive filler has a Iodine number which is at least: 20, 30, 40, 45, 50, 55 or alternatively 60 mg/g.

Further, any of the above lower limits of the BET nitrogen surface area and any of the above lower limits of the Iodine number, respectively, may be combined with any upper limit of the BET nitrogen surface area, and any upper limit of the Iodine number, respectively, as described herein.

It has surprisingly been found that by using the specific polymer blend in the semiconductive composition in accordance with the present invention it is possible to simultaneously fulfill desired requirements of mechanical flexibility, environmental stress cracking performance (ESCR), shore D and electrical properties also in a semiconductive composition comprising comparably higher content levels of conductive fillers, also wherein the conductive filler has a BET nitrogen surface area which is less than 700 m²/g, or wherein the conductive filler has an Iodine number which is less than 700 mg/g.

Further, it has also been surprisingly found that by using the specific polymer blend in the semiconductive composition in accordance with the present invention it is possible to simultaneously fulfill desired requirements of mechanical flexibility, environmental stress cracking performance (ESCR), shore D and electrical properties also in a semiconductive compositions comprising comparably higher content levels of conductive fillers, also wherein the conductive filler is selected from furnace carbon black, modified furnace carbon black or acetylene carbon black.

Thus, the multimodal high density polyolefin with a sufficiently low MFR (a sufficiently low MFR often corresponds to a sufficiently high $M_w$), which is comprised in a semiconductive composition in accordance with the present invention, enhances environmental stress cracking performance (ESCR) and shore D of the semiconductive composition, whereas the thermoplastic elastomer, which is comprised in a semiconductive composition in accordance with the present invention, improves mechanical flexibility or notched bending cracking resistance of the semiconductive composition, even when the semiconductive composition comprises a high content of conductive filler.

Spatial distribution of the conductive filler (e.g. furnace carbon black, modified furnace carbon black or acetylene carbon black), as described herein, in the semiconductive composition may be heterogeneous or homogeneous in one or several of the phases/domains which depends on, for example, crystallinity and/or chemical interaction. The conductive filler (e.g. furnace carbon black, modified furnace carbon black or acetylene carbon black), as described herein, may be spatially heterogeneously distributed in the semiconductive composition, specifically, due to a high crystallinity in the multimodal high density polyolefin phase/domain.

Furthermore, the conductive filler (e.g. furnace carbon black, modified furnace carbon black or acetylene carbon black), as described herein, may be fed and mixed together with the other components of the semiconductive composition during compounding. Further, the conductive filler may, alternatively, be separately fed, mixed and compounded with one or more components of the semiconductive composition before the compounding comprises the other component/s of the semiconductive composition. Furthermore, the complete components of the semiconductive composition except the conductive filler may be compounded before the conductive filler is compounded with the rest of the components, or, alternatively, a part, or parts, of "two or more components" of the semiconductive composition may be compounded separately with the conductive filler before the compounding comprises the rest of the component/s of the composition.

It is intended throughout the present description that "compounding" embraces mixing of the material according to standard methods known to those skilled in the art.

Any conventional compounding or extruder unit may be used, which includes, for example, co-rotating or counter-rotating twin extruders, or internal mixers such as Banbury type mixers or single crew extruders such as Buss co-kneader, or any conventional single screw extruder.

Any suitable process known in the art may be used for the preparation of the semiconductive compositions of the present invention. A suitable process may, for example, be dry-mixing, solution mixing, solution shear mixing, melt mixing, or extrusion.

Further, it has also been shown that the used conductive filler does not necessarily need to be of a highly conductive type such as, for example, Ketjenblack or a special grade of modified furnace carbon black. Thus, a standard carbon black, such as, for example, furnace carbon black, a standard grade of modified furnace carbon black or acetylene carbon black, may be used with excellent result. Further benefits are also the substantially less cost of the formulation of the semiconductive composition as well as the excellent availability of a conductive filler, such as standard carbon black.

A conductive filler of the Ketjenblack type is both very expensive and very difficult to be secured.

In a further embodiment the semiconductive composition, in accordance with the present invention, comprises a multimodal high density polyolefin which is a bimodal high density polyolefin.

Still a further embodiment of the present invention relates to a semiconductive composition, as described herein, wherein the thermoplastic elastomer is an unsaturated polyolefin.

In an even further embodiment the semiconductive composition, in accordance with the present invention, comprises a thermoplastic elastomer which is an ethylene alkyl acrylate copolymer, e.g. ethylene methyl acrylate copolymer, ethylene ethyl acrylate copolymer or ethylene butyl acrylate copolymer.

Still a further embodiment of the present invention discloses a semiconductive composition wherein the conductive filler is a carbon black.

An even further embodiment of the present invention discloses a semiconductive composition wherein the conductive filler is selected from furnace carbon black, modified furnace carbon black or acetylene carbon black.

A further embodiment of the invention relates to a semiconductive composition, as described herein, which semiconductive composition comprises 70 to 90 wt % of a polymer blend, 10 to 30 wt % of a conductive filler and 0.4 to 1.0 wt % of an antioxidant; wherein said polymer blend comprises 45 to 80 wt % of a multimodal high density polyolefin, which high density polyolefin has a melt flow rate (MFR2@190° C.) according to ISO 1133 (190° C., 2.16 kg) which is 0.1 to 1.2 g/10 min, and 20 to 55 wt % of a thermoplastic elastomer; and wherein the conductive filler has a BET nitrogen surface area (according to ASTM D6556), which is 20 to 600 $m^2$/g or, alternatively, an Iodine number (according to ASTM D1510), which is 20 to 600 mg/g.

In still a further embodiment the semiconductive composition of the present invention comprises a conductive filler, as described herein, which conductive filler has a BET nitrogen surface area which is less than 300 $m^2$/g, or has an Iodine number which is less than 300 mg/g.

In even a further embodiment the semiconductive composition of the present invention comprises a conductive filler, as described herein, which conductive filler has a BET nitrogen surface area which is less than 150 $m^2$/g, or has an Iodine number which is less than 150 mg/g.

In an even further embodiment the semiconductive composition of the present invention comprises a conductive filler, as described herein, wherein the conductive filler has a DBP oil absorption (i.e. DBPA) (according to ASTM D 2414), which is less than 320 ml/100 g, or, for example, less than 250 ml/100 g.

DBPA (i.e. DBP oil absorption) is related to the size of aggregation of a conductive filler, e.g. of a carbon black. Normally, the larger the size of aggregation is in a conductive filler of a semiconductive composition, the higher conductivity has the semiconductive composition.

BET nitrogen surface area and Iodine number are proportional to the total surface area of a conductive filler, e.g. of a carbon black. Normally, the higher the surface area is in the conductive filler of a semiconductive composition, the higher conductivity has the semiconductive composition. The higher conductivity is due to the increased connection channels between conductive fillers in the semiconductive composition.

Since, for example, ketjenblack type has a high DBP value of typically 320 ml/100 g and also a high BET nitrogen surface area of typically 800 m$^2$/g or a high Iodine number of typically 800 mg/g, such conductive filler gives a high conductivity to a semiconductive composition, due to the large size of aggregation and also high surface area. However, in order for the semiconductive composition of the present invention to be conductive while maintaining good mechanical performance, no conductive filler with both the large size of aggregation, as well as the high surface area, is required for the semiconductive composition.

In a further embodiment of the present invention a semiconductive composition is disclosed wherein the antioxidant is selected from the group of diphenyl amines and diphenyl sulfides. The phenyl substituents of these diphenyl amines and diphenyl sulfides may be substituted with further groups such as alkyl, alkylaryl, arylalkyl or hydroxy groups.

In a still further embodiment of the present invention a semiconductive composition is disclosed wherein the antioxidant is selected from the groups of the diphenyl amines and diphenyl sulfides which are substituted with tert.-butyl groups, or in meta or para position, which may bear further substituents, for example, phenyl groups.

An even further embodiment of the present invention discloses a semiconductive composition wherein the antioxidant is 4,4'-bis (1,1'-dimethyl benzyl) diphenylamine.

In a further embodiment for improvement of extrudability of the semiconductive composition, the semiconductive composition of the present invention comprises a processing agent. Examples of the processing agent are, but are not limited to, metal salts of carboxylic acids such as zinc stearate, calcium stearate, fatty acids, fatty amides, polyethylene wax, copolymers of ethylene oxide and propylene oxide, ethylene vinyl acetate copolymer, petroleum waxes, non ionic surfactants and polysiloxanes.

In still a further embodiment of the semiconductive composition, the semiconductive composition of the present invention comprises a flame retardant filler, whereby the property of flame retardancy is improved. Examples of the flame retardant filler are, but are not limited to, minerals such as aluminum trihydroxide, magnesium dihydroxide, hydromagnesite, huntite, antimony trioxide, pentoxide, sodium antimonite, and calcium carbonate; and organohalogen compounds such as decabromodiphenyl ether and decabromodiphenyl ethane; and polymeric brominated compounds such as brominated polystyrenes, brominated carbonate oligomers, brominated epoxy oligomers, tetrabromophthalic anyhydride, tetrabromobisphenol A and hexabromocyclododecane; and organophosphorus compounds such as organophosphates, ammonium polyphosphate, tris (2,3-dibromopropyl) phosphate, TPP, RDP, BPADP, tri-o-cresyl phosphate, phosphonates such as DMMP and phosphinates, and chlorophoshates such as TMCP and TDCP.

In a further embodiment the semiconductive composition of the present invention comprises an additional inorganic filler. Examples of the additional inorganic filler are, but are not limited to, clays, talc, precipitated silica, silicates, fumed silica, calcium carbonate and montmorillonite.

A further embodiment relates to a semiconductive composition of the present invention, where the multimodal high density polyolefin comprises a multimodal molecular weight distribution α-olefin polymer mixture obtained by polymerization of α-olefin in more than two stages, the α-olefin polymer mixture having a density of about 930 to 970 kg/m$^3$ and a melt flow rate (MFR2@190° C.) which is less than 1.6 g/10 min, said α-olefin polymer mixture comprises at least a first and a second α-olefin polymer, of which the first α-olefin polymer has a density of about 930 to 975 kg/m$^3$ and a melt flow rate (MFR2@190° C.) of 50 to 2000 g/10 min, and the density and the melt flow rate of the second α-olefin polymer are chosen so that the resulting α-olefin polymer mixture obtains said density and said melt flow rate.

Still a further embodiment of the present invention relates to a process for producing a semiconductive composition, as described herein, wherein the process comprises mixing conductive filler together with the polymer blend during compounding.

The invention also relates to a semiconductive jacket comprising the semiconductive composition, as described herein.

Further, the invention also relates to a power cable comprising the semiconductive jacket of the present invention, as described herein, and to a power cable comprising the semiconductive composition of the present invention, as described herein.

Medium and high voltage power cables may comprise six major elements. The elements may be, from the interior to the exterior of the cables, a conductor made of a conducting material such as copper and aluminum, a semiconductive conductor shield, an insulating layer, a semiconductive insulation shield, a metallic screen or sheath layer, and a jacket. The semiconductive composition of the present invention may be applied to, for example, any, or both, of the semiconductive shield and jacket in any power cable construction. The semiconductive shield and jacket, both of the present invention, may be formed by extrusion process using a commercially available extruder conventionally used for power cable production.

In accordance with the present invention, extrusion conditions for power cable production known to the person skilled in the art may be utilized. Moreover, settings of the barrel temperature of the extruder may be used in accordance with the corresponding settings which are used for commercially available high density polyolefins, e.g., the main barrel temperature settings may range from 110 to 250° C. While the main temperature settings may preferably be chosen to be sufficiently above the melting point of the semiconductive composition of the present invention.

In order to increase the conductivity, or to decrease the volume resistivity (VR) value, of the semiconductive composition of the present invention, the cooling process of the extruded composition may, immediately after the extrusion process, preferably be tempered by maximizing the spatial distance from the extrusion die to the cooling water bath, and/or the temperature of the water bath may be set above 40° C., preferably above 50° C., or more preferably above 60° C. These conditions may enhance the heterogeneity of the spatial distribution of the conductive filler due to an increased crystalline phase/domain of the multimodal high density polyolefin. This may result in an increased amount of connection channels between the conductive fillers in the semiconductive composition.

Moreover, the invention also relates to a semiconductive composition, as described herein, where the multimodal high density polyolefine comprises a multimodal molecular weight distribution α-olefin polymer mixture which is obtained by a polymerization process as described herein.

Furthermore, the invention also relates to a semiconductive composition, as described herein, where the multimodal high density polyolefine comprises a multimodal molecular weight distribution α-olefin polymer mixture which is obtained by a polymerization process as described herein, where the polymerization stages have been carried out as slurry polymerisation (e.g. in a loop reactor), gas-phase polymerization or a combination thereof.

Furthermore, the invention also relates to a semiconductive composition, as described herein, where the multimodal high density polyolefine comprises a multimodal molecular weight distribution α-olefin polymer mixture which is obtained by a polymerization process as described herein, where the polymerization has been carried out in a loop-reactor/gas-phase reactor process in at least one loop reactor followed by at least one gas-phase reactor.

Furthermore, the invention also relates to a semiconductive composition, as described herein, where the multimodal high density polyolefine comprises a multimodal molecular weight distribution α-olefin polymer mixture which is obtained by a polymerization process as described herein, where the polymerization has been carried out with the aid of chromium, metallocene or Ziegler-Natta catalyst in several successive polymerisation reactors.

Moreover, the invention also relates to a process for producing a semiconductive composition, as described herein, wherein the process comprises mixing conductive filler together with the polymer blend during compounding.

Further, the invention also related to use of a semiconductive jacket of the present invention, as described herein, or the semiconductive composition of the present invention, as described herein, in, for example, a power cable.

Methods

ESCR:

The environmental stress crack resistance (ESCR) was determined in accordance with ASTM D-1693 (Condition B, 10% Igepal CO 630).

Bend Cracking Test:

Following the sample preparation of the ESCR method, and the cracking degree of the notched part of the sample was obtained by the bending procedure in accordance with ASTM D-1693.

Shore D:

The indentation hardness of plastics, i.e. the Shore D hardness, was determined according to ISO 868, 2012 and ISO 7619-1, 2012. The measurements were done on square discs with the dimension 75×75×6.0 mm and which disks were punched from compression moulded sheets. The sheets were moulded at 175° C. with a cooling rate of 15° C./min. Finally, the square disks are conditioned at 23° C. at 50% relative humidity for at least one hour.

Five measurements per sample are made. The measurement points are selected so that there is at least 20 mm distance to the edge of the disc and at least 6 mm distance to the nearest previous measurement point.

During the measurement the foot of the Shore D hardness measurement device is forced into the disc and depth of penetration is measured after 3 seconds.

VR@90° C.:

The volume resistivity (VR) was measured on samples according to ISO 3915 (1999). The samples of 2 mm thick plagues were prepared by tape extrusion (1.8 mm thick, Collin Teach-Line E 20T with setting with 60° C./180° C./180° C./180° C./190° C./200° C. for barrel temperature for Zone 1, Zone 2, Zone 3, Zone 4, Zone 5 and Zone 6, respectively) and a following compression moulding with the temperature setting ranging from 120 to 180° C. and the pressure ranging from 20 to 200 bar.

MFR2@190° C. and MFR21@190° C.:

The melt flow rate was measured according to ISO 1133 (1999), indicated in g/10 min and determined at a temperature of 190° C. and at different loadings. The loadings for MFR2@190° C. and MFR21@190° C. are 2.16 kg, 21.6 kg, respectively.

EXAMPLES

The invention will now be illustrated by the following non-limiting examples.

Semiconductive composition in accordance with the present invention, and the semiconductive compositions of the comparative examples, were both prepared by first compounding the components followed by extruding the compounded components, using a Buss MDK 46 kneader (Supplier: Buss, reciprocating co-kneader with special screw design).

Examples 1, 2, 3, 4 and 5 (Inventive Examples)

Semiconductive Compositions, Examples 1, 2, 3, 4 and 5, Comprising Multimodal High Density Polyolefin, Thermoplastic Elastomer, Conductive Filler and Antioxidant Multimodal High Density Polyolefin For Examples 1, 2, 3, 4 and 5: 47.04, 45.24, 46.92, 52.44, and 47.04 wt %, respectively, of a multimodal high density polyolefin, i.e. a bimodal high density polyethylene, which has a density of 946 kg/m³ and a melt flow rate (MFR2@190° C.) according to ISO 1133 (190° C., 2.16 kg) which is 0.55 g/10 min, where the multimodal high density polyolefin, i.e. the bimodal high density polyethylene, was prepared as described herein below.

The multimodal high density polyolefin, i.e. a bimodal high density polyethylene, was produced in a polymerisation plant comprising of a first reactor, i.e. a loop reactor, which was connected in series to a second reactor, i.e. a gas-phase reactor, and wherein in the polymerisation a Ziegler-Natta catalyst was utilised.

In the first reactor, i.e. the loop reactor, a first polymer (Polymer 1.1) was produced by the polymerisation of ethylene in the presence of hydrogen (molar ratio of hydrogen to ethylene=roughly 0.70:1). The resulting ethylene homopolymer had an MFR2@190° C. value of about 400 g/10 min and a density of about 0.970 g/cm³.

In the second reactor, i.e. the gas-phase reactor, a second polymer (Polymer 1.2) was produced by the polymerisation of ethylene with butene (molar ratio of butene to ethylene=roughly 0.20:1, and molar ratio of hydrogen to ethylene=roughly 0.04:1). The resulting copolymer of ethylene and butene was present in the form of an intimate mixture with the ethylene homopolymer from the first reactor, the weight ratio of Polymer 1.1 to Polymer 1.2 being 45:55.

The bimodal mixture of Polymer 1.1 and Polymer 1.2 has a butene content of about 2 wt %.

The weight average molecular weight ($M_w$) and the number average molecular weight ($M_n$) are 140 kg/mol and 7 kg/mol, respectively, and thus $M_w/M_n$ is 20.

Thermoplastic Elastomer

For Examples 1, 2, 3, 4 and 5: 31.36, 30.16, 31.28, 34.96, and 31.36 wt %, respectively, of a grade of a thermoplastic elastomer, i.e. ethylene butyl acrylate (EBA) copolymer, having a melt flow rate (MFR2@190° C.) according to ISO 1133 (190° C., 2.16 kg) which is 4.5 g/10 min and the content of butyl acrylate which is 7.5 mol % or 27 wt % with regard to the total amount of monomers in EBA. The saturated polyolefin were prepared by a high pressure polymerisation process.

Conductive Filler

For examples 1, 2 and 3: 21, 24, and 21 wt %, respectively, of a conductive filler, i.e. a commercially available standard grade of a modified furnace carbon black having a BET nitrogen surface area (according to ASTM D6556) which is 65 m$^2$/g, and a DBPA oil absorption (according to ASTM D2414): 190 ml/100 g, for Example 4: 12 wt % of a conductive filler, i.e. a commercially available special grade of a modified furnace carbon black having a BET nitrogen surface area (according to ASTM D6556) which is 770 cm$^3$/g, and a DBPA oil absorption (according to ASTM D2414): 320 ml/100 g, of which paremeters are similar level to typical values of Ketjenblack, for Example 5: 21 wt % of a commercially available grade of a conductive filler, i.e. a carbon black having an Iodine number (according to ASTM D1510) which is 587 mg/g, and a DBPA oil absorption (according to ASTM D2414): 131 ml/100 g.

Antioxidant

For Examples 1, 2, 4 and 5: 0.6 wt % of a commercially available grade of an antioxidant being 2,2,4-trimethyl-1,2-dihydroquinoline (CAS 26780-96-1) and for Example 3: 0.8 wt % of a commercially available grade of an antioxidant being 4,4'-bis(1,1'-dimethylbenzyl) diphenylamine (CAS 10081-67-1).

Examples 6, 7 and 8 (Comparative Examples)

Semiconductive Compositions, Examples 6, 7 and 8, Comprising Multimodal High Density Polyolefin, Thermoplastic Elastomer, Conductive Filler and Antioxidant Multimodal High Density Polyolefin For Examples 6, 7 and 8: 41.5, 46.44 and 50.31 wt %, respectively, of a multimodal high density polyolefin, i.e. a bimodal high density polyethylene, having a density of 944 kg/m$^3$ and a melt flow rate (MFR2@190° C.) according to ISO 1133 (190° C., 2.16 kg) which is 1.7 g/10 min; the multimodal high density polyolefin, i.e. the bimodal high density polyethylene, was prepared using the same polymerisation plant that was used for the preparation of the bimodal high density polyethylene of the inventive Examples 1, 2, 3, 4 and 5, but with the below conditions;

In the first reactor, i.e. the loop reactor, a first polymer (Polymer 2.1) was produced by the polymerisation of ethylene in the presence of hydrogen (molar ratio of hydrogen to ethylene=roughly 0.60:1). The resulting ethylene homopolymer had an MFR2@190° C. value of about 400 g/10 min and a density of about 0.970 kg/cm3.

In the second reactor, i.e. the gas-phase reactor, a second polymer (Polymer 2.2) was produced by the polymerisation of ethylene with butene (molar ratio of butene to ethylene=roughly 0.35:1, and molar ratio of hydrogen to ethylene=roughly 0.07:1). The resulting copolymer of ethylene and butene was present in the form of an intimate mixture with the ethylene homopolymer from the first reactor, the weight ratio of Polymer 2.1 to Polymer 2.2 being 45:55.

The bimodal mixture of Polymer 2.1 and Polymer 2.2 has a butene content of about 3 to 4 wt %.

The weight average molecular weight ($M_w$) and the number average molecular weight ($M_n$) are 120 kg/mol and 7 kg/mol, respectively, and thus $M_w/M_n$ is 17.

Thermoplastic Elastomer

For Examples 6, 7 and 8: 44.7, 30.96 and 27.09 wt %, respectively, of the thermoplastic elastomer, i.e. of the same ethylene butyl acrylate (EBA) copolymer which was used for inventive Examples 1, 2, 3, 4 and 5.

Conductive Filler

For Example 6: 13 wt % of a conductive filler, i.e. the commercially available special grade of the highly conductive carbon black used in the inventive Example 4, and for both Examples 7 and 8: 22 wt % of a conductive filler, i.e. a commercially available standard grade of the modified furnace carbon black used in the inventive Examples 1, 2 and 3; and Antioxidant For Examples 6, 7 and 8: 0.8, 0.6 and 0.6 wt %, respectively, of an antioxidant, i.e. a commercially available grade of an antioxidant being 2,2,4-trimethyl-1,2-dihydroquinoline (CAS 26780-96-1).

Further, during the compounding step the temperature zones of the Buss MDK 46 kneader were ranging from 140 to 180° C., and during the extrusion the extrusion temperature was around 160° C. The obtained melted mix was then pelletized, and pellets of each example were used for measuring the relevant properties, as described herein, by using the methods disclosed in "Methods".

Table 1 shows the properties of the inventive Examples 1, 2, 3, 4 and 5, and of the comparative Examples 6, 7 and 8. When a multimodal high density polyolefin having a high MFR2@190° C., i.e. as in the comparative Examples 6, 7 and 8, is used in the base resin blend, i.e. the polymer blend, a high Shore D, a low VR (or high conductivity) and appropriate MFR21@190° C. can be obtained for different grades of conductive fillers. However, when using the multimodal high density polyolefin having a high MFR2@190° C., a good ESCR and a good resistance of bending cracking test could only be achieved for high conductive grades of conductive fillers having a BET nitrogen surface area (according to ASTM D6556) which is 770 m$^2$/g, or a DBPA oil absorption (according to ASTM D2414) which is 320 ml/100 g. When a commercially available standard grade of conductive filler, having a BET nitrogen surface area (according to ASTM D6556) which is 65 m$^2$/g, or having a DBPA oil absorption (according to ASTM D2414) which is 190 [ml/100 g], was used, the semiconductive composition could only be appropriately semiconductive when the conductive filler content is at least about 22 wt %. The high loading of the conductive filler gives a low ESCR. Although ESCR could be improved by increasing the content of the multimodal high density polyolefin, the resulting semiconductive composition would then be too brittle for bending.

However, when a multimodal high density polyolefin having a low MFR2@190° C., i.e. as in the inventive Examples 1, 2, 3, 4 and 5, is used in the base resin blend, i.e. the polymer blend, the resulting semiconductive composition exhibited excellent performance of both mechanical flexibility and ESCR while VR was maintained at a low level, surprisingly, also when non high conductive grades of conductive fillers were used. Thus, in Examples 1, 2, 3 and 5, the resulting semiconductive composition exhibited excellent performance of both mechanical flexibility and ESCR while VR was maintained at a low level, when the following non high conductive grades of conductive fillers were used: in Examples 1, 2, and 3: a commercially available standard grade of conductive filler having a BET nitrogen surface area (according to ASTM D6556) which is 65 m²/g, or a DBPA oil absorption (according to ASTM D2414) which is 190 ml/100 g, or in Example 5: a commercial available conductive filler having an Iodine number (according to ASTM D1510) which is 587 m²/g, or a DBPA oil absorption (according to ASTM D2414) which is 131 ml/100 g was used, which requires a high content (21 wt %) of the conductive filler to maintain the low VR value. Furthermore, when 4,4'-bis(1,1'-dimethylbenzyl) diphenylamine (CAS 10081-67-1) was used as the antioxidant (as in Example 3) instead of the antioxidant 2,2,4-trimethyl-1,2-dihydroquinoline (CAS 26780-96-1), VR, MFR21@190° C. and, even, Shore D were improved. Thus, 4,4'-bis(1,1'-dimethylbenzyl) diphenylamine (CAS 10081-67-1) may advantageously be used in the semiconductive composition of the present invention.

TABLE 1

Performance of inventive Examples 1-5 and comparative Examples 6-8

| Example | ESCR F0 [h] | Bend cracking test | Shore D | VR@90° C. [ohm cm] | MFR21@190° C. [g/10 min] |
|---|---|---|---|---|---|
| 1 | >3000 | No cracking | 54 | 88 | 14 |
| 2 | >3000 | No cracking | 58 | 18 | 8.28 |
| 3 | >3000 | No cracking | 57 | 25 | 22 |
| 4 | >3000 | No cracking | 53 | 41 | 32.75 |
| 5 | >3000 | No cracking | 57 | 158 | 6.89 |
| 6 | 1600 | No cracking | 50 | 19 | 55.62 |
| 7 | 20 | No cracking | 57 | 41 | 32 |
| 8 | 170 | Small cracking | 59 | 22 | 29 |

The invention claimed is:

1. A semiconductive composition, which semiconductive composition comprises 50 to 98 weight percentage (wt %) of a polymer blend, 2 to 50 wt % of a conductive filler and 0.05 to 2 wt % of an antioxidant; wherein said polymer blend comprises 10 to 99 wt % of a multimodal high density polyolefin, which high density polyolefin has a density which is from 930 to 970 kg/m³ and a melt flow rate (MFR2@190° C.) according to ISO 1133 (190° C., 2.16 kg) which is less than 1.6 g/10 min, and 1 to 90 wt % of a thermoplastic elastomer.

2. A semiconductive composition according to claim 1, wherein the semiconductive composition comprises 60 to 91 wt % of the polymer blend, 9 to 40 wt % of the conductive filler and 0.1 to 1.0 wt % of the antioxidant; wherein said polymer blend comprises 30 to 90 wt % of the multimodal high density polyolefin and 10 to 70 wt % of the thermoplastic elastomer.

3. A semiconductive composition according to claim 1, wherein the multimodal high density polyolefin is a bimodal high density polyolefin.

4. A semiconductive composition according to claim 1, wherein the multimodal high density polyolefin has a melt flow rate (MFR2@190° C.) according to ISO 1133 (190° C., 2.16 kg) which is 1.2 g/10 min or less.

5. A semiconductive composition according to claim 1, wherein the multimodal high density polyolefin of which Mw is from 500 to 60 kg/mol and Mw/Mn is more than 10.

6. A semiconductive composition according to claim 1, where the multimodal high density polyolefin comprises a multimodal molecular weight distribution α-olefin polymer mixture.

7. A semiconductive composition according to claim 1, where the multimodal high density polyolefin comprises ethylene copolymer of at least one chosen from butene, 4-methyl-1-pentene, 1-hexene and 1-octene.

8. A semiconductive composition according to claim 1, where the multimodal high density polyolefin comprises a mixture of a low-molecular ethylene homopolymer and a high-molecular ethylene copolymer of at least one chosen from butene, 4-methyl-1-pentene, 1-hexene and 1-octene.

9. A semiconductive composition according to claim 1, wherein the conductive filler has a BET nitrogen surface area (according to ASTM D6556), which is less than 700 m²/g or an Iodine number (according to ASTM D1510), which is less than 700 mg/g.

10. A semiconductive composition according claim 1, which comprises 70 to 90 wt % of a polymer blend, 10 to 30 wt % of a conductive filler and 0.4 to 1.0 wt % of an antioxidant; wherein said polymer blend comprises 45 to 80 wt % of a multimodal high density polyolefin, which high density polyolefin has a melt flow rate (MFR2@190° C.) according to ISO 1133 (190° C., 2.16 kg) which is 0.1 to 1.2 g/10 min, and 20 to 55 wt % of a thermoplastic elastomer, and wherein the conductive filler has a BET nitrogen surface area (according to ASTM D6556), which is 20 to 600 m²/g or, alternatively, an Iodine number (according to ASTM D1510), which is 20 to 600 mg/g.

11. A semiconductive composition according to claim 1, wherein the conductive filler has a BET nitrogen surface area which is less than 300 m²/g, or has an Iodine number which is less than 300 mg/g.

12. A semiconductive composition according to claim 1, wherein the conductive filler has a BET nitrogen surface area which is less than 150 m²/g, or has an Iodine number which is less than 150 mg/g.

13. A semiconductive composition according to claim 1, wherein the conductive filler has a DBP oil absorption (i.e. DBPA) (according to ASTM D 2414), which is less than 320 ml/100 g.

14. A semiconductive composition according to claim 1, wherein the conductive filler is a carbon black, furnace carbon black, modified furnace carbon black or acetylene carbon black.

15. A semiconductive composition according to claim 1, wherein the thermoplastic elastomer is an unsaturated polyolefin.

16. A semiconductive composition according to claim 1, wherein the thermoplastic elastomer is an ethylene alkyl acrylate copolymer, an ethylene ethyl acrylate copolymer, an ethylene butyl acrylate copolymer or an ethylene methyl acrylate copolymer.

17. A semiconductive composition according to claim 1, where the multimodal high density polyolefine comprises a multimodal molecular weight distribution α-olefin polymer mixture obtained by polymerization of α-olefin in more than two stages, the α-olefin polymer mixture having a density of about 930 to 970 kg/m3 and a melt flow rate (MFR2@190° C.) which is less than 1.6 g/10 min, said α-olefin polymer mixture comprises at least a first and a second α-olefin polymer, of which the first α-olefin polymer has a density of about 930 to 975 kg/m3 and a melt flow rate (MFR2@190° C.) of 50 to 2000 g/10 min, and the density and the melt flow rate of the second α-olefin polymer are chosen so that the resulting α-olefin polymer mixture obtains said density and said melt flow rate.

18. A process for producing a semiconductive composition according to claim 1, wherein the process comprises mixing conductive filler together with the polymer blend during compounding.

19. A semiconductive jacket comprising the semiconductive composition according to claim 1.

20. A power cable comprising the semiconductive jacket according to claim 19.

21. A semiconductive composition according to claim 1, wherein the conductive filler has a DBP oil absorption (i.e. DBPA) (according to ASTM D 2414), which is less than 250 ml/100 g.

* * * * *